United States Patent [19]

Clark

[11] Patent Number: 5,347,872
[45] Date of Patent: Sep. 20, 1994

[54] MAGNETOMECHANICAL SENSOR ATTACHMENT METHOD

[75] Inventor: Arthur E. Clark, Adelphi, Md.

[73] Assignee: The United States of America as represented by the Secretary of the Navy, Washington, D.C.

[21] Appl. No.: 900,045

[22] Filed: Aug. 25, 1986

[51] Int. Cl.$^5$ .............................................. G01B 7/24
[52] U.S. Cl. ............................... 73/779; 73/DIG. 2
[58] Field of Search .............. 73/788, 794, 801, 802, 73/775, 779, DIG. 2

[56] References Cited

U.S. PATENT DOCUMENTS 4,500,864  2/1985  Nakane et al. ...................... 73/726

FOREIGN PATENT DOCUMENTS 0011308  1/1980  Japan ................................. 73/775

Primary Examiner—Ian J. Lobo
Attorney, Agent, or Firm—Roger D. Johnson

[57] ABSTRACT

A method of measuring strain in material by (1) selecting a metallic glass ribbon of the composition $$Fe_wB_xSi_yC_z$$

wherein
$0.70 \leq w \leq 0.83$,
$0.10 \leq x \leq 0.20$,
$0.03 \leq y \leq 0.10$,
$0 \leq z \leq 0.03$, and
$w+x+y+z=1.00$ wherein the metallic glass ribbon is essentially strain free and has easy axes of magnetization which are in the plane of the ribbon transverse (at 90°) to the long axis of the ribbon;

(2) bonding the metallic glass ribbon to material to be measured by means of a homogeneous viscous organic liquid having a viscosity greater than $10^5$ cp at 25° C.;

(3) allowing the viscous liquid to relax until the metallic glass ribbon is not stressed by the viscous liquid and is in a state of constant strain within it magnetostrictive dynamic range; and (4) measuring the susceptibility of the metallic glass ribbon which is directly proportional to strain within the material being measured.

12 Claims, No Drawings

MAGNETOMECHANICAL SENSOR ATTACHMENT METHOD

BACKGROUND OF THE INVENTION

This invention relates to the measurement of strain (or stress) in materials and more particularly to magnetostrictive techniques for measuring strain.

Most often strains (or stresses) in materials have been measured by resistive strain gauges. Semiconductor strain gauges have been developed which have sensitivities of about two orders of magnitude greater than the resistive strain gauges. The semiconductor strain gauges however are sensitive to temperature changes. Recently magnetostrictive strain gauges have been developed which are even more sensitive (about one order of magnitude) than the semiconductor strain gauges. Nevertheless, prior art methods of using magnetostriction appear to be limited in their potential sensitivity. Therefore, it would be desirable to provide a new method of using magnetostriction to measure strains which would be far more sensitive.

SUMMARY OF THE INVENTION

Accordingly, an object of this invention is to provide a very sensitive method for measuring strain.

Another object of this invention is to provide a method for measuring strain with very high resolution.

A further object of this invention is to provide a method for measuring strain which has a broad dynamic range.

Yet another object of this invention is to provide a method for measuring strain over a broad range of frequencies.

A still further object of this invention is to provide a method for measuring strain which has a very small temperature dependence.

These and other objects of this invention are accomplished by providing a method for measuring in a material by (1) selecting a metallic glass ribbon of the composition $$Fe_wB_xSi_yC_z$$

wherein
0.70≦w≦0.83,
0.10≦x≦0.20,
0.03≦y≦0.10,
0≦z≦0.03, and
wherein the metallic glass ribbon is essentially strain free and has easy axes of magnetization which are in the plane of the ribbon transverse (at 90°) to the long axis of the ribbon;

(2) bonding the metallic glass ribbon to material to be measured by means of a homogeneous viscous organic liquid having a viscosity greater than $10^5$ cp at 25° C.;

(3) allowing the viscous liquid to relax until the metallic glass ribbon is not stressed by the viscous liquid and is in a state of constant strain within its magnetostrictive dynamic range; and (4) measuring the susceptibility of the metallic glass ribbon which is directly proportional to strain within the material being measured.

DETAILED DESCRIPTION OF THE PREFERRED EMBODIMENT

The magnetostrictive element used in this invention is a treated ribbon of an amorphous metal glass of the formula $$Fe_wB_xSi_yC_z$$

wherein w represents the atomic fraction of iron, the dominant component in the metallic glass. Broadly, 0.70≦w≦0.83 but preferably 0.79≦w≦0.82.

For x, the atomic fraction of boron, 0.10≦x≦0.20 but preferably 0.135≦x≦0.15.

For y, the atomic fraction of silicon, 0.03≦y≦0.10 but preferably 0.03≦y≦0.06.

For z, the atomic fraction of carbon, 0≦z≦0.03 but preferably 0≦z≦0.02.

Finally, w+x+y+z=1, with allowance for minor amounts of non-interfering impurities or additives. The amorphous metal glass ribbon of the desired composition is prepared by conventional procedures. Most preferred are metal glass ribbons having the formula $Fe_{81}B_{13.5}Si_{3.5}C_2$ which are available commercially from Allied Chemical Corporation, Morris Township, N.J., under the tradename Metglas 2605SC.

The ribbon is then treated to have magnetostrictive properties according to the procedures disclosed in copending U.S. patent application Ser. No. 613,835 now U.S. Pat. No. 4,763,030 filed on May 24, 1984, by Arthur E. Clark et al. and titled, "Magnetomechanical Energy Conversion," herein incorporated by reference. Briefly, strains that are produced in the metallic glass ribbon at the time it is formed are removed by annealing the ribbon. A magnetic field of from 100 Oe to 10 kOe lying in the plane of the ribbon and traverse (at 90°) to the long axis of the ribbon is applied during the annealing and maintained as the ribbon is cooled to ambient temperature. The resulting ribbon is strain-free with an axis of magnetostriction along its long axis and built-in easy magnetic axes which are in the plane of the ribbon and traverse to the long axis of the ribbon.

Strains in a material are conventionally measured by bonding a magnetostrictive element to the material using a cement or glue. Strains occurring in the material will then put stresses on the magnetostrictive element which deleteriously change the susceptibility of the magnetostrictive element.

The magnetostrictive metallic glass ribbon elements used in the method of this invention are extremely sensitive to pressures and stresses. This means that the measurement of very small strains is possible. Unfortunately, conventional cements and glues put permanent stresses on these magnetostrictive elements which strain the elements to a position outside of the dynamic ranges of operation. As a result, these elements can not then function as sensitive strain gauges.

A critical feature of the present invention is use of a highly viscous liquid having a viscosity of >$10^5$ cp, preferably $10^6$ to $10^8$ cp, and more preferably about $10^7$ cp at 25° C. to bond the magnetostrictive metallic glass ribbon element to the material being measured. The liquid is heated until the viscosity is lowered and the liquid becomes flowable. The liquid is then applied to the ribbon element and the element is held against the material to be measured while the liquid cools. Upon cooling, the viscous liquid bonds the magnetostrictive ribbon element to the material to be measured just as cement or glue would. At this point, the viscous liquid strains the magnetostrictive element outside of its dynamic range of operation as a cement or glue would. However, unlike a cement or glue, the viscous liquid relaxes with time until the magnetostrictive metallic ribbon is in a blocked (constant strain) condition while at the same time being stress-free. In this condition, the metallic glass ribbon is very sensitive to strains in the material to be measured. Strains as low as $3 \times 10^{-10}$ have been measured and a dynamic range of $10^4$ has been obtained.

As stated, the viscous liquid selected should have a viscosity $>10^5$ cp preferably from $10^6$ to $10^8$ cp, and more preferably about $10^7$ cp at 25° C. The amount of time required for the viscous liquid to relax places a practical upper limit on the viscosity. A liquid with a viscosity of $10^7$ cp at 25° C. relaxes sufficiently for a stress-free ribbon in about 10 minutes. The time for a $10^6$ cp at 25° C. liquid will be a few seconds whereas the relaxation time for a $10^8$ cp at 25° C. liquid is estimated to be several hours. The lower limit of the viscosity range is determined by the requirement that the liquid provide a good bond between the magnetostrictive metallic glass ribbon and the material being measured. The lower limit of the viscosity range is also limited by the frequency of the strains being measured. This frequency must be greater than the reciprocal of the relaxation time of the viscous liquid.

The liquid should also be homogeneous having a constant viscosity throughout. Thus gels are not suitable. The liquid should also maintain a relatively constant viscosity throughout the period of relaxation and measurement, therefore volatile solvents should not be used to adjust the viscosity nor should a reactive viscous liquid be used. Changes in the viscosity of the liquid may result in stresses on the magnetostrictive metallic glass ribbon causing it to be strained out of the operative dynamic range.

Aroclor 1262 (from Monsanto) which is a commercial mixture of polychloronated biphenyls (PCB's) containing 62 percent by of chlorine worked well in tests as the viscous liquid ($\simeq 10^7$ cp at 25° C.) bonding agent. In general, polychlorinated biphenyl mixtures containing from 60 to 64, preferably from 61 to 63, and more preferably about 62 weight percent of chlorine may be used as the viscous liquid bonding agent. [Caution: these materials have toxic effects in humans and have been listed as carcinogens by the EPA. These compounds are extremely stable and care must be taken not to release them to the environment. EPA regulations governing the use of PCB's should be consulted. See also the Merck Index, tenth edition, No. 7437. Polychloronated Biphenyls.] The amount of Aroclor 1262 used was minimal, comparable to that used in mounting microscope slides.

Since the susceptibility of the magnetostrictive metallic glass ribbon as used in the present method is highly strain dependent, a measurement of the susceptibility is a direct measurement of the strain in the ribbon which is directly proportional to the strain in the material being measured. The difference between the susceptibility of metallic glass ribbon and its permeability is extremely small and may be ignored. A measurement of the permeability of the metallic glass ribbon therefore provides a good measurement of the susceptibility of the ribbon and thus good measurement of the strain. The method was tested using the experimental procedures for measuring strain by means of a magnetostrictive metallic glass ribbon as disclosed in the, "Theory and Application of Highly Magnetoelastic Metglas 2605SC," by H. T. Savage and M. L. Spano, Journal Applied Physics, 53(11), November 1982, at page 8096 herein incorporated by reference.

We define a figure of merit (F.M.) as $(\Delta\mu/\mu)/(\Delta l/l)$ in analogy with $(\Delta R/R)/(\Delta l/l)$ for a conventional resistive strain gauge. Values of F.M. of about $2 \times 10^5$ were obtained. This is three orders of magnitude better than semiconductor strain gauges and five orders of magnitude better than a conventional resistive strain gauge.

The main features of the method of this invention are its large dynamic range, high sensitivity and strain resolution, very small temperature dependence and broad frequency range. In a simple device, we measured strains as low as $3 \times 10^{-10}$ and secured a dynamic range of $10^4$. The potential dynamic range exceeds $10^5$. Measurements of F.M. and dynamic range were made from 0.01 Hz to 1 Hz. No deterioration in operational characteristics far above 1 Hz. (e.g., in megahertzs) is expected. Calculations also indicate only a slight temperature dependence of the F.M. from 0° K. to 500° K.

The method of using very viscous liquids for bonding according to this invention may be used to improve the performance of other magnetostrictive amorphous metallic glass ribbons in the measurement of strains in materials.

Obviously, numerous modifications and variations of the present invention are possible in light of the above teachings. It is therefore to be understood that within the scope of the appended claims the invention may be practiced otherwise than as specifically described herein.

What is claimed is:

1. A method for measuring strain in a material object comprising the steps of (1) selecting a metallic glass ribbon of the composition

$$Fe_wB_xSi_yC_z$$

wherein
0.70≦w≦0.83,
0.10≦x≦0.20,
0.03≦y≦0.10,
0≦z≦0.03, and
w+x+y+z=1.00
wherein the metallic glass ribbon is essentially strain free and has easy axes of magnetization which are in the plane of the ribbon transverse (at 90°) to the long axis of the ribbon;

(2) bonding the metallic glass ribbon to the material object by means of a homogeneous viscous organic liquid having a viscosity greater than $10^5$ cp at 25° C.;

(3) allowing the viscous liquid to relax until the metallic glass ribbon is not stressed by the viscous liquid and is in a state of constant strain within its magnetostrictive dynamic range; and (4) measuring the susceptibility of the metallic glass ribbon which is directly proportional to strain within the material being measured.

2. The method of claim 1 wherein the homogeneous viscous organic liquid is heated until it is flowable before being applied in step (2) of claim 1 and the metallic glass ribbon then is held in place against the material object while the liquid cools to ambient temperature.

3. The method of claim 1 wherein the homogeneous viscous organic liquid has a viscosity of from $10^6$ to $10^8$ cp at 25° C.

4. The method of claim 3 wherein the homogeneous viscous organic liquid has a viscosity of approximately $10^7$ cp at 25° C.

5. The method of claim 1 wherein the homogeneous viscous organic liquid is a mixture of polychloronated biphenyls.

6. The method of claim 5 wherein the mixture of polychloronated biphenyls is from 60 to 64 percent by weight chlorine.

7. The method of claim 6 wherein the mixture of polychloronated biphenyls is from 61 to 63 percent by weight chlorine.

8. The method of claim 7 wherein the mixture of polychloronated biphenyls is approximately 62 percent by weight chlorine.

9. The method according to claim 1 wherein $0.79 \leq w \leq 0.82$.

10. The method according to claim 1 wherein $0.135 \leq x \leq 0.15$.

11. The method according to claim 1 wherein $0.03 \leq y \leq 0.06$.

12. The method according to claim 1 wherein $0 \leq z \leq 0.02$.

* * * * *